Nov. 17, 1931.　　　M. C. NELSON　　　1,832,815

WHEEL MOUNTING

Filed Aug. 29, 1927

INVENTOR
Max C. Nelson,
BY
R. O. Wagner
ATTORNEY

Patented Nov. 17, 1931

1,832,815

UNITED STATES PATENT OFFICE

MAX C. NELSON, OF AKRON, OHIO, ASSIGNOR TO THE GOODYEAR TIRE & RUBBER COMPANY, OF AKRON, OHIO, A CORPORATION OF OHIO

WHEEL MOUNTING

Application filed August 29, 1927. Serial No. 216,165.

My invention relates to wheel mountings for vehicle tires and it has particular relation to so-called dual mountings wherein a plurality of tire carrying rims are secured to a common felloe.

The object of my invention is to provide a simple, practical and efficient dual mounting comprising a relatively small number of parts, the assembly of which can be expeditiously accomplished.

Many forms of dual mountings have been proposed but a great many of these have been abandoned for various reasons, such as multiplicity of parts and complicated operation. By practicing my invention these disadvantages are obviated, and the expenses incidental to the operation of vehicles having dual wheel mountings of the type previously known are greatly reduced.

For a better understanding of my invention, reference may now be had to the accompanying drawings, forming a part of this specification, of which:

Figure 1:
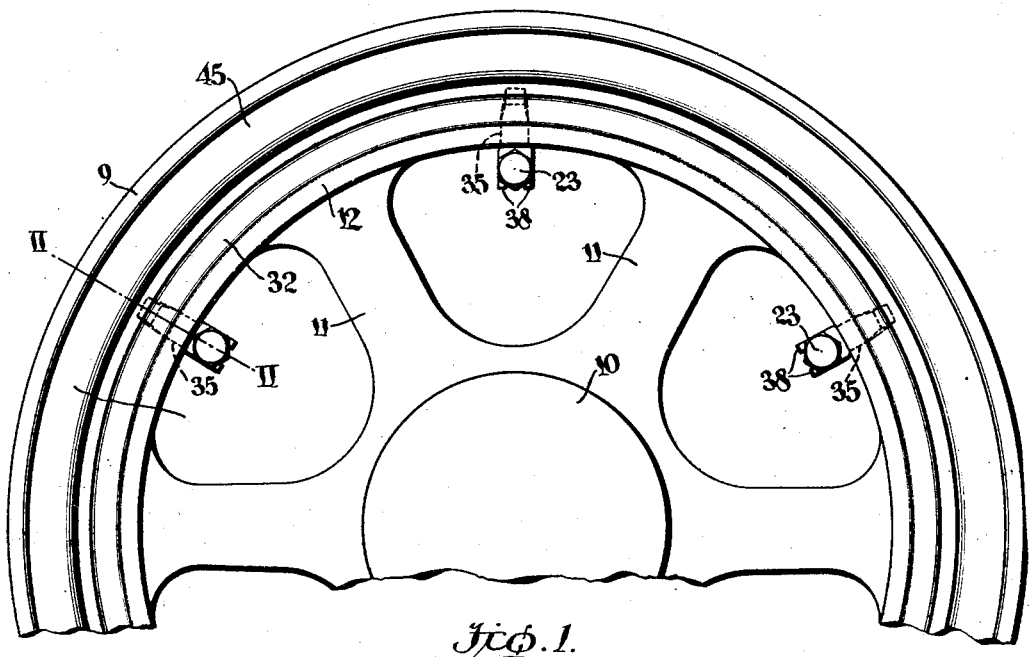
Fig. 1 is a fragmentary side elevational view of a wheel embodying my invention.
Figure 2:
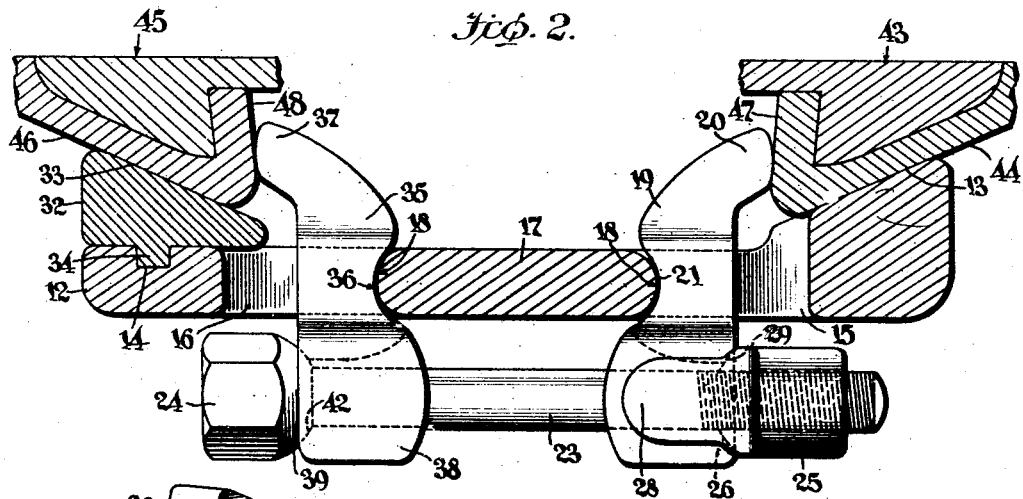
Fig. 2 is a cross-sectional view, on a larger scale, taken substantially along the line II—II of Fig. 1 and illustrating the arrangement of various elements embodying the invention.
Figure 3:
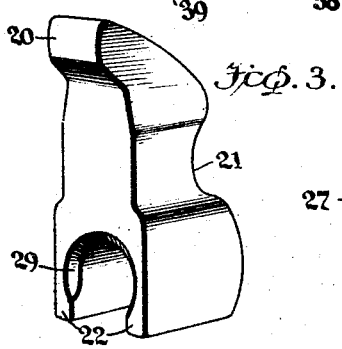
Fig. 3 is a perspective view, on a larger scale, showing in detail one of the securing elements included in my improved wheel mounting.
Figure 4:
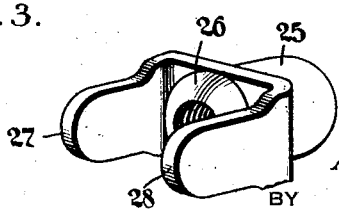
Fig. 4 is a perspective view, on a larger scale, of one of the fulcrum lugs embodied in my invention.

In practicing my invention I provide a cast metal wheel 9 comprising a hub portion 10, spokes 11, and a felloe 12. The felloe 12 is provided at one side with a thickened outwardly tapered rim seating portion 13. The opposite side of the felloe is formed with an annular channel 14. At suitable intervals the periphery of the felloe is provided with oppositely disposed apertures 15 and 16, which are separated by a web portion 17 having its edges rounded, as shown at 18.

A lug 19, comprising an outwardly turned upper end portion 20, a reduced intermediate portion 21 and a bifurcated lower end 22, is adapted to be disposed within the aperture 15, and is normally maintained therein by means of a bolt 23 having a head 24 at one end and a lug 25 screw threaded upon the other end thereof. The lug 25 comprises a substantially spherical bearing portion 26 and side extensions 27 and 28, between which the lug 19 is adapted to be disposed. A substantially spherical seat 29 normally engages the spherical bearing 26. A split ring 32, having a tapered rim seating surface 33 is formed with a radially inwardly disposed rib 34, which is adapted to be disposed within the annular channel 14.

A lug 35, identical in construction with the lug 19, is disposed within the aperture 16, and is provided with an intermediate reduced portion 36 and end portions 37 and 38, the latter of which is bifurcated. The head 24 of the bolt 23 has a spherical bearing portion 39 that engages a complementary spherical seat 42 formed upon the bifurcated end 38.

A tire supporting rim 43, having an inclined seat 44, rests upon the inclined seat 13 and constitutes the inner rim; i. e. the rim adjacent the vehicle chassis. Likewise an outer rim 45 having an inclined seat 46 rests upon the inclined seat 33 of the split ring 32.

After the rims 43 and 45 have been so disposed loosely on their respective seats, the lugs 19 and 35 are inserted into the apertures 15 and 16, their upper ends engaging abutments or shoulders 47 and 48 of the tire carrying rims. The intermediate reduced portions 21 and 36 of the lugs engage the rounded edges 18 of the apertures and fulcrum thereagainst. The bolt 23 is then disposed within the bifurcated ends 22 and 38 of the lugs and is turned by applying a suitable wrench to the head 24. It will be apparent that during rotation of the bolt 23, the lug 25 will be prevented from rotating because the side portions 27 and 28 engage the lug 19, and as the bolt 23 is rotated in a clockwise direction, the lugs 19 and 35 will fulcrum about the rounded edges 18 of the apertures 15 and 16 and their outer ends 20 and 37 will be forced apart, thereby securely wedging the rims upon their tapered seats. In demounting the rims, it is only necessary to loosen the bolts 23 sufficiently to permit them to drop from the bifurcated ends of the lugs when the rims may be readily removed.

From the foregoing description, it will be apparent that I have provided a simple, practical and efficient means for securing a plurality of rims to a common felloe, the construction of which is applicable to various constructions and sizes of demountable vehicle rims.

Although I have illustrated but one form which my invention may assume and have described in detail but a single application thereof, it will be apparent to those skilled in the art that the invention is not so limited but that various modifications may be made therein without departing from the spirit of the invention or from the scope of the appended claims.

What I claim is:

1. A vehicle wheel mounting comprising a felloe having a plurality of radially disposed apertures arranged in pairs therein, means for supporting a plurality of tire rims on the felloe, pivotal means disposed in the apertures and a common means for forcing the pivotal means oppositely in each pair of apertures to secure the rims on the supports.

2. A vehicle wheel mounting comprising a felloe having a plurality of radially disposed apertures therein, means for supporting a plurality of rims on the felloe, rim securing lugs pivotally disposed in the apertures, each lug having an outwardly turned end, a reduced intermediate portion and a bifurcated lower end, and means for moving the lugs in opposite directions against the rims.

3. A vehicle wheel mounting comprising a felloe having a plurality of radially disposed apertures arranged in pairs therein, rim securing lugs pivotally disposed in the apertures and means connecting the lower ends of the lugs operable to cause simultaneous movement of the lugs in opposite directions.

4. A vehicle wheel mounting comprising a felloe having an inclined rim supporting surface adjacent one edge thereof and a channel adjacent the opposite edge thereof, a plurality of radially disposed apertures arranged in pairs around the circumference of the felloe, lugs pivotally disposed in the apertures, a split rim supporting ring disposed in the channel, a pair of tire rims supported on the ring and the inclined surface respectively and engaged by one end of each of the lugs, and a bolt connecting the other end of each lug operable to force the rims against their seats.

5. A vehicle wheel mounting comprising a felloe having apertures therein, a pair of rims supported by the felloe, and interconnected lugs pivoted in such apertures and engageable respectively with the rims, said lugs being movable in planes transversely of the felloe.

6. A vehicle wheel mounting comprising a felloe having apertures spaced about its circumference, rim supporting surfaces upon the edges of the felloe, lugs disposed in the apertures and fulcrumed on the edge of the felloe defining the apertures, and adjustable means interconnecting each pair of lugs for engaging the ends of the lugs with rims mounted on the rim supporting surfaces.

7. A vehicle wheel mounting comprising a wheel having oppositely inclined rim supporting surfaces at the edges thereof, a pair of rims having inclined seating surfaces mounted upon the supporting surfaces of the wheel, a plurality of bolts extending transversely of the wheel and below the rim supporting surfaces, and means disposed between the surfaces and operatively connected to each of the bolts for moving the rims in opposite directions.

In witness whereof, I have hereunto signed my name.

Signed at Akron, in the county of Summit, and State of Ohio, this 27th day of August, 1927.

MAX C. NELSON.